Patented July 15, 1952

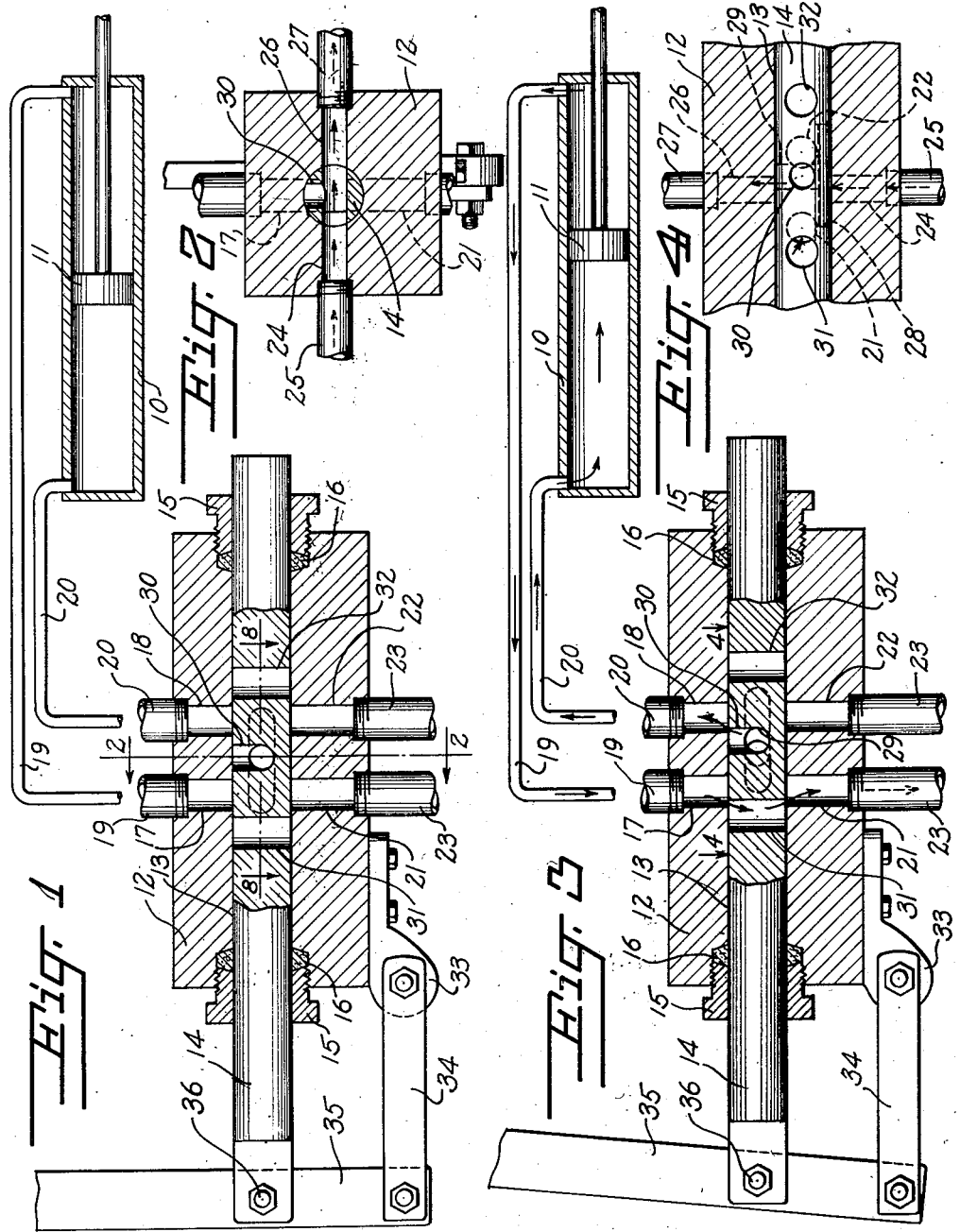

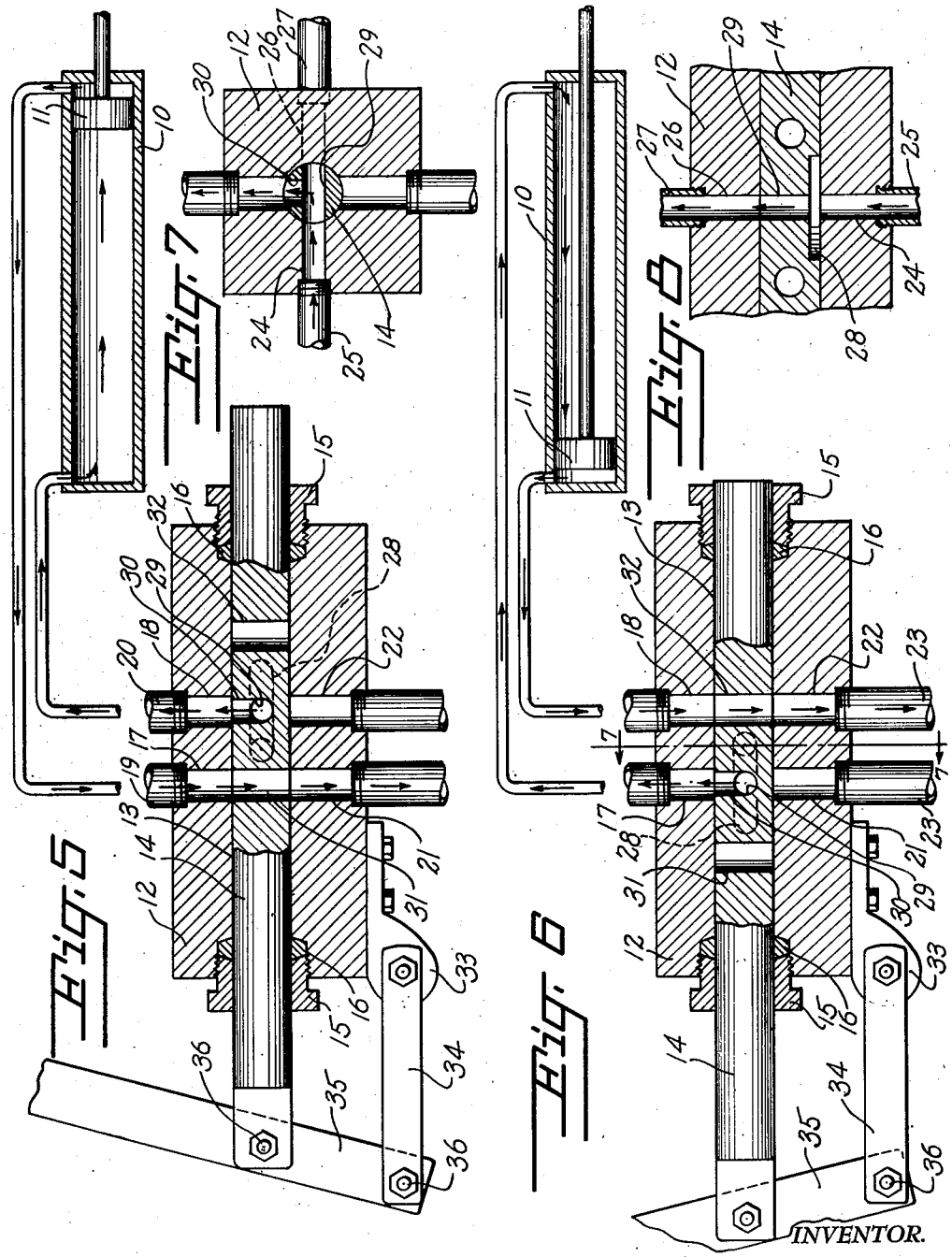

2,603,192

UNITED STATES PATENT OFFICE 2,603,192

HYDRAULIC VALVE FOR CONTROLLING THE FLOW OF FLUID TO CYLINDERS

John R. Kensok, Minnesota Lake, Minn.

Application December 1, 1948, Serial No. 62,923

2 Claims. (Cl. 121—46.5)

This invention relates to a valve, and more particularly to a hydraulic valve for controlling the flow of liquid under pressure to a hydraulic cylinder.

The object of the invention is to provide a hydraulic valve wherein a distributing piston is reciprocated manually to direct a fluid under pressure to a cylinder to move a controlled piston therein from one end to the other.

Another object of the invention is to provide a hydraulic valve which is capable of diverting the flow of liquid under pressure to alternate ends of a reciprocable piston for moving the latter from one end to the other.

A further object of the invention is to provide a hydraulic speed control valve which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a longitudinal vertical sectional view of the hydraulic speed-control valve in neutral position, according to the present invention;

Figure 2 is a sectional view taken on the line 2—2 of Figure 1;

Figure 3 is a view similar to Figure 1, but showing the position of the distributing piston shifted slightly;

Figure 4 is a sectional view taken on the line 4—4 of Figure 3;

Figure 5 is a view similar to Figure 1, but illustrating the position of the distributing piston when a complete positive pressure is being exerted on the reciprocating piston;

Figure 6 is a view showing the position of the valve parts when the reciprocating piston is at the extreme opposite end from that of Figure 5;

Figure 7 is a sectional view taken on the line 7—7 of Figure 6;

Figure 8 is a sectional view taken on the line 8—8 of Figure 1.

Referring in detail to the drawings, the numeral 10 designates a cylinder and slidably arranged in the cylinder 10 is a piston 11 which may be connected to a suitable accelerator (not shown) for controlling the speed of a suitable power unit. For causing sliding movement of the piston 11, there is provided a hydraulic valve which comprises a valve body 12 provided with a longitudinally-extending chamber 13. Slidably arranged in the chamber 13 is a distributing piston 14, there being a packing gland 15 threaded into each end of the chamber 13 for abutting suitable packing 16 to provide a fluid-tight connection between the moving parts.

The valve body 12 is provided in its top with a first pair of vertically-disposed, spaced, parallel passageways 17 and 18 which are connected by pipes 19 and 20, respectively, to opposite ends of the cylinder 10. Arranged in the valve body 12 below this first pair of passageways is a second pair of vertically disposed passageways 21 and 22 which are for conveying or returning hydraulic fluid to pipes 23 which lead to a suitable reservoir (not shown). Arranged in one side of the valve body 12 is a horizontally-disposed inlet port 24 for the ingress therethrough of hydraulic fluid under pressure, there being a pipe 25 connecting the port 24 to a suitable pump (not shown). Arranged in the other side of the valve body is a horizontally-disposed outlet port 26 for the egress therethrough of hydraulic fluid, there being a pipe or conduit 27 connecting the outlet port 26 to the reservoir.

The distributing piston 14 is provided on one side with a cut-out 28 for receiving hydraulic fluid from the inlet port 24. A horizontally-disposed bore 29 communicates with the cut-out 28 and extends transversely through the distributing piston 14. Communicating with the bore 29 is a transverse vertically-disposed bore 30 which has a diameter slightly less than the diameter of the passageways 17 and 18. The distributing piston 14 also includes a pair of vertically-disposed, spaced, parallel ports 31 and 32 for a purpose to be subsequently described.

For causing sliding movement of the distributing piston 14, a bracket 33 is secured by bolts to the bottom of the valve body 12 and connected to the bracket 33 is one end of a lug 34. A lever 35 has its lower end pivotally connected to the other end of the lug 34 and pivotally connected to the lever 35, as at 36 is one end of the distributing piston 14.

In use, the distributing piston is shown in Figure 1 in neutral position so that all of the hydraulic fluid passes directly from the inlet port 24 straight through the bore 29 in the piston, and out through the outlet port 26 to the reservoir. To move the piston 11 to the right, the lever 35 is pivoted to move the distributing piston to the right slightly. This causes the vertically-disposed bore 30 of the distributing piston to be moved into communication with the passageway 18 so that the piston 11 will be moved to the right, Figure 3. At the same time, the bore 31 begins to register with the passageways 17 and 21 so that hydraulic fluid can be returned in the direction of the arrows to the reservoir. In Figure 5, the distributing piston 14 is shown moved all the way to the right so that the hydraulic fluid all goes through the bore 30, through the passageway 18 to thereby force the piston all the way to the right. To move the piston 11 to its extreme left position, Figure 6, the lever 35 is pivoted in the opposite direction so that all of the fluid passes through the bore 30, into the passageway 17 and to the cylinder 10. The bore 32 registers with the passageways 18 and 22 so that the fluid is returned to the reservoir.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a hydraulic speed-control valve, a valve body provided with a longitudinally extending chamber, a distributing piston slidably arranged in said chamber, a packing gland threaded into each end of the chamber, there being an inlet port in one side of said valve body for the ingress therethrough of hydraulic fluid, there being a discharge port in the other side of said valve body in alinement with said inlet port for the egress therethrough of hydraulic fluid, said valve body being provided in the top thereof with a first pair of spaced parallel vertically disposed passageways for conveying hydraulic fluid therethrough, there being a second pair of vertically disposed spaced parallel passageways in the bottom of said valve body in alinement with said first pair of passageways for the passage therethrough of hydraulic fluid, there being a cutout in one side of said piston for receiving hydraulic fluid from said inlet port, said distributing piston being provided with a horizontally disposed transversely extending bore communicating with said cutout and with the alined inlet and outlet ports when the piston is in neutral position, there being a vertically disposed bore communicating with said horizontally disposed bore and adapted to be moved into and out of registry with said first pair of passageways, said distributing piston having a pair of spaced parallel vertically disposed ports for selectively connecting one of said first pair of passageways with one of said second pair of passageways, and means for causing sliding movement of said distributing piston, whereby when the piston is in vertical position hydraulic fluid will pass through the inlet port and outwardly of the outlet port to a reservoir, and when the piston is moved to the right the vertically disposed bore of the piston will be in communication with one of said first and second passageways so that said hydraulic fluid can be returned to the reservoir through one of the vertically disposed ports in said piston and the fluid will enter the other of said first passageways and force the piston further to the extreme right and when the piston is moved to the left the hydraulic fluid will reverse the flow with regard to the said first passageways to move the piston to the extreme left.

2. In a hydraulic speed-control valve, a valve body provided with a longitudinally extending chamber, a distributing piston slidably arranged in said chamber, a packing gland threaded into each end of the chamber, there being an inlet port in one side of said valve body for the ingress therethrough of hydraulic fluid, there being a discharge port in the other side of said valve body in alinement with said inlet port for the egress therethrough of hydraulic fluid, said valve body being provided in the top thereof with a first pair of spaced parallel vertically disposed passageways for conveying hydraulic fluid therethrough, there being a second pair of vertically disposed spaced parallel passageways in the bottom of said valve body in alinement with said first pair of passageways for the passage therethrough of hydraulic fluid, there being a cutout in one side of said piston for receiving hydraulic fluid from said inlet port, said distributing piston being provided with a horizontally disposed transversely extending bore communicating with said cutout and with the alined inlet and outlet ports when the piston is in neutral position, there being a vertically disposed bore communicating with said horizontally disposed bore and adapted to be moved into and out of registry with said first pair of passageways, said distributing piston having a pair of spaced parallel vertically disposed ports for selectively connecting one of said first pair of passageways with one of said second pair of passageways, and means for causing sliding movement of said distributing piston, whereby when the piston is in vertical position hydraulic fluid will pass through the inlet port and outwardly of the outlet port to a reservoir, and when the piston is moved to the right the vertically disposed bore of the piston will be in communication with one of said first and second passageways so that said hydraulic fluid can be returned to the reservoir through one of the vertically disposed ports in said piston and the fluid will enter the other of said first passageways and force the piston further to the extreme right and when the piston is moved to the left the hydraulic fluid will reverse the flow with regard to the said first passageways to move the piston to the extreme left, said last-named means comprising a bracket secured to said valve body, a lug having one end operatively connected to said bracket, and a lever having its lower end pivotally connected to the other end of said lug and pivotally connected to said distributing piston.

JOHN R. KENSOK.

REFERENCES CITED

The following references are of record in the file of this patent:

UNITED STATES PATENTS

| Number | Name | Date |
|--------|------|------|
| 650,777 | Bromley | May 29, 1900 |
| 2,105,473 | Dean | Jan. 18, 1938 |
| 2,109,162 | Boehle | Feb. 22, 1938 |
| 2,293,906 | Kvavle et al. | Aug. 25, 1942 |
| 2,415,417 | Collins et al. | Feb. 11, 1947 |
| 2,475,298 | Sloane | July 5, 1949 |